(12) United States Patent
Deshmukh et al.

(10) Patent No.: US 7,844,646 B1
(45) Date of Patent: Nov. 30, 2010

(54) METHOD AND APPARATUS FOR REPRESENTING FILE SYSTEM METADATA WITHIN A DATABASE FOR EFFICIENT QUERIES

(75) Inventors: Vijay Deshmukh, Mountain View, CA (US); Benjamin Swartzlander, San Jose, CA (US); Barry Schwartz, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 403 days.

(21) Appl. No.: 10/800,163

(22) Filed: Mar. 12, 2004

(51) Int. Cl.
*G06F 17/30* (2006.01)

(52) U.S. Cl. .................. 707/825; 707/827; 707/828; 707/829; 707/999.2

(58) Field of Classification Search ............ 707/1–10, 707/100–102, 104.1, 200–205, 825, 827–829, 707/999.2; 711/11–114, 154, 162; 714/1–6; 709/215–219
See application file for complete search history.

(56) References Cited

U.S. PATENT DOCUMENTS

| | | | |
|---|---|---|---|
| 5,146,540 A | | 9/1992 | Natarajan |
| 5,313,631 A | | 5/1994 | Kao |
| 5,555,417 A | * | 9/1996 | Odnert et al. ............ 717/159 |
| 5,566,328 A | * | 10/1996 | Eastep ................... 707/102 |
| 5,970,494 A | * | 10/1999 | Velissaropoulos et al. ... 707/102 |
| 5,987,506 A | * | 11/1999 | Carter et al. ............. 709/213 |
| 5,999,930 A | * | 12/1999 | Wolff ....................... 707/8 |
| 6,023,706 A | * | 2/2000 | Schmuck et al. .......... 707/200 |
| 6,052,724 A | | 4/2000 | Willie et al. |
| 6,072,936 A | * | 6/2000 | Koyama .................. 386/95 |
| 6,138,249 A | | 10/2000 | Nolet |
| 6,192,191 B1 | * | 2/2001 | Suga et al. ............... 386/120 |
| 6,199,082 B1 | * | 3/2001 | Ferrel et al. ............. 715/522 |
| 6,292,797 B1 | * | 9/2001 | Tuzhilin et al. ............ 707/6 |
| 6,298,349 B1 | * | 10/2001 | Toyoshima et al. ........ 707/100 |
| 6,311,194 B1 | | 10/2001 | Sheth et al. |
| 6,356,902 B1 | * | 3/2002 | Tan et al. ................ 707/10 |

(Continued)

FOREIGN PATENT DOCUMENTS

WO    WO 02/25870    3/2002

OTHER PUBLICATIONS

David Marshall, Threads: Basic Theory and Libraries, May 1999, pp. 2-32.

(Continued)

*Primary Examiner*—Miranda Le
(74) *Attorney, Agent, or Firm*—Perkins Coie LLP

(57) ABSTRACT

According to an embodiment of the present invention, a filer or other storage server is coupled to a network to store files for users of the network. An agent is coupled to the filer, and performs a scan or file walk for a Multi-Appliance Management Application (MMA) which is coupled to the filer and can monitor and manage the filer. The agent assigns identification (ID) numbers to the directories while scanning them. The ID numbers are assigned in a depth first search (DFS) order to reduce the amount of resources required for specific queries that may later be required. Several types of queries, including determining the parent of a node, determining all of the children of a node, determining the immediate children of a node, and determining all of the ancestors of a node may be easily accomplished using the ID numbers.

14 Claims, 7 Drawing Sheets

U.S. PATENT DOCUMENTS

| | | | | |
|---|---|---|---|---|
| 6,389,427 | B1* | 5/2002 | Faulkner | 707/104.1 |
| 6,430,611 | B1 | 8/2002 | Kita et al. | |
| 6,457,017 | B2* | 9/2002 | Watkins et al. | 707/103 R |
| 6,480,901 | B1 | 11/2002 | Weber et al. | |
| 6,519,612 | B1* | 2/2003 | Howard et al. | 707/200 |
| 6,553,377 | B1 | 4/2003 | Eschelbeck et al. | |
| 6,563,521 | B1* | 5/2003 | Perttunen | 715/854 |
| 6,571,257 | B1 | 5/2003 | Duggan et al. | |
| 6,578,048 | B1* | 6/2003 | Mauldin | 707/104.1 |
| 6,625,615 | B2* | 9/2003 | Shi et al. | 707/103 R |
| 6,625,624 | B1* | 9/2003 | Chen et al. | 707/204 |
| 6,636,250 | B1* | 10/2003 | Gasser | 715/853 |
| 6,687,729 | B1* | 2/2004 | Sievert et al. | 718/102 |
| 6,725,261 | B1 | 4/2004 | Novaes et al. | 709/220 |
| 6,754,890 | B1* | 6/2004 | Berry et al. | 717/128 |
| 6,801,903 | B2 | 10/2004 | Brown et al. | |
| 6,857,012 | B2 | 2/2005 | Sim et al. | |
| 6,915,409 | B1 | 7/2005 | Peterson | |
| 6,922,708 | B1* | 7/2005 | Sedlar | 707/202 |
| 6,947,940 | B2* | 9/2005 | Anderson et al. | 707/10 |
| 6,961,909 | B2* | 11/2005 | Lord et al. | 715/853 |
| 6,973,577 | B1 | 12/2005 | Kouznetsov | |
| 7,007,024 | B2* | 2/2006 | Zelenka | 707/8 |
| 7,007,244 | B2* | 2/2006 | Pankovcin | 715/853 |
| 7,013,323 | B1* | 3/2006 | Thomas et al. | 709/203 |
| 7,024,427 | B2* | 4/2006 | Bobbitt et al. | 707/200 |
| 7,054,927 | B2* | 5/2006 | Ulrich et al. | 709/223 |
| 7,080,277 | B2* | 7/2006 | Anna et al. | 714/2 |
| 7,089,313 | B2 | 8/2006 | Lee | |
| 7,096,315 | B2 | 8/2006 | Takeda et al. | |
| 7,120,757 | B2* | 10/2006 | Tsuge | 711/147 |
| 7,139,811 | B2 | 11/2006 | Lev Ran et al. | |
| 7,167,915 | B2 | 1/2007 | Bendich et al. | |
| 7,203,731 | B1* | 4/2007 | Coates et al. | 709/214 |
| 7,275,063 | B2* | 9/2007 | Horn | 707/102 |
| 7,289,973 | B2* | 10/2007 | Kiessig et al. | 707/1 |
| 7,293,039 | B1 | 11/2007 | Deshmukh et al. | |
| 7,433,942 | B2 | 10/2008 | Butt et al. | |
| 7,539,702 | B2 | 5/2009 | Deshmukh et al. | |
| 7,630,994 | B1 | 12/2009 | Deshmukh et al. | |
| 2002/0049782 | A1* | 4/2002 | Herzenberg et al. | 707/500.1 |
| 2002/0091710 | A1 | 7/2002 | Dunham et al. | |
| 2002/0147805 | A1 | 10/2002 | Leshem et al. | |
| 2002/0175938 | A1 | 11/2002 | Hackworth | |
| 2003/0046369 | A1 | 3/2003 | Sim et al. | |
| 2003/0115218 | A1* | 6/2003 | Bobbitt et al. | 707/200 |
| 2004/0030586 | A1 | 2/2004 | Cucchiara et al. | |
| 2004/0078461 | A1 | 4/2004 | Bendich et al. | |
| 2004/0098363 | A1 | 5/2004 | Anglin et al. | |
| 2004/0098383 | A1 | 5/2004 | Tabellion et al. | |
| 2004/0122936 | A1 | 6/2004 | Mizelle et al. | |
| 2004/0133606 | A1* | 7/2004 | Miloushev et al. | 707/200 |
| 2004/0143608 | A1* | 7/2004 | Nakano et al. | 707/204 |
| 2004/0181605 | A1* | 9/2004 | Nakatani et al. | 709/233 |
| 2004/0196970 | A1 | 10/2004 | Cole | |
| 2004/0205143 | A1* | 10/2004 | Uemura | 709/208 |
| 2005/0022153 | A1* | 1/2005 | Hwang | 717/100 |
| 2005/0050269 | A1 | 3/2005 | Horn | |
| 2005/0086192 | A1* | 4/2005 | Kodama | 707/1 |
| 2005/0102289 | A1* | 5/2005 | Sonoda et al. | 707/10 |
| 2005/0108474 | A1* | 5/2005 | Zhang et al. | 711/114 |
| 2005/0108484 | A1 | 5/2005 | Park | |
| 2005/0166094 | A1 | 7/2005 | Blackwell et al. | |
| 2006/0041656 | A1 | 2/2006 | Li et al. | |
| 2008/0091739 | A1 | 4/2008 | Bone et al. | |

OTHER PUBLICATIONS

Co-pending U.S. Appl. No. 10/798,990 filed Mar. 12, 2004.
Co-pending U.S. Appl. No. 10/799,861 filed Mar. 12, 2004.
Co-pending U.S. Appl. No. 10/798,987 filed Mar. 12, 2004.
Co-pending U.S. Appl. No. 11/848,165 filed Aug. 30, 2007.
Co-pending U.S. Appl. No. 12/074,178 filed Feb. 29, 2008.
Non-Final Office Action mailed Nov. 25, 2009 in Co-pending U.S. Appl. No. 12/074,178 filed Feb. 29, 2008.
Notice of Allowance Mailed Feb. 9, 2009 in Co-pending U.S. Appl. No. 10/798,990 filed Mar. 12, 2004.
Non-Final Office Action Mailed Aug. 18, 2008 in Co-pending U.S. Appl. No. 10/798,990 filed Mar. 12, 2004.
Final Office Action Mailed May 1, 2008 in Co-pending U.S. Appl. No. 10/798,990 filed Mar. 12, 2004.
Non-Final Office Action Mailed Aug. 19, 2007 in Co-pending U.S. Appl. No. 10/798,990 filed Mar. 12, 2004.
Final Office Action Mailed Apr. 4, 2007 in Co-pending U.S. Appl. No. 10/798,990 filed Mar. 12, 2004.
Non-Final Office Action Mailed Oct. 2, 2006 in Co-pending U.S. Appl. No. 10/798,990 filed Mar. 12, 2004.
Notice of Allowance Mailed Jul. 29, 2009 in Co-pending U.S. Appl. No. 10/799,861 filed Mar. 12, 2004.
Non-Final Office Action Mailed Feb. 6, 2009 in Co-pending U.S. Appl. No. 10/799,861 filed Mar. 12, 2004.
Final Office Action Mailed Oct. 16, 2008 in Co-pending U.S. Appl. No. 10/799,861 filed Mar. 12, 2004.
Non-Final Office Action Mailed Apr. 21, 2008 in Co-pending U.S. Appl. No. 10/799,861 filed Mar. 12, 2004.
Non-Final Office Action Mailed Sep. 17, 2007 in Co-pending U.S. Appl. No. 10/799,861 filed Mar. 12, 2004.
Final Office Action Mailed Apr. 4, 2007 in Co-pending U.S. Appl. No. 10/799,861 filed Mar. 12, 2004.
Non-Final Office Action Mailed Sep. 20, 2006 in Co-pending U.S. Appl. No. 10/799,861 filed Mar. 12, 2004.
Notice of Allowance Mailed Jul. 6, 2007 in Co-pending U.S. Appl. No. 10/798,987 filed Mar. 12, 2004.
Final Office Action Mailed Mar. 19, 2007 in Co-pending U.S. Appl. No. 10/798,987 filed Mar. 12, 2004.
Non-Final Office Action Mailed Sep. 27, 2006 in Co-pending U.S. Appl. No. 10/798,987 filed Mar. 12, 2004.
Final Office Action Mailed Jun. 10, 2010 in Co-Pending U.S. Appl. No. 12/074,178 filed Feb. 29, 2008.
Non-Final Office Action Mailed Jul. 27, 2010 in Co-Pending U.S. Appl. No. 11/848,165 filed Aug. 30, 2007.

* cited by examiner

| NODE | PARENT | SIZE | CREATION TIME | NAME |
|---|---|---|---|---|
| 1 | 0 | 4.1GB | 3/1/2003 12:00a | /u/ |
| 2 | 1 | 812 MB | 3/1/2003 1:00a | /u/employees/ |
| 7 | 1 | 1.2 GB | 3/1/2003 1:02a | /u/administrators/ |
| 3 | 2 | 704 MB | 3/14/2003 2:14p | /u/employees/a-m/ |

*FIG. 3B*

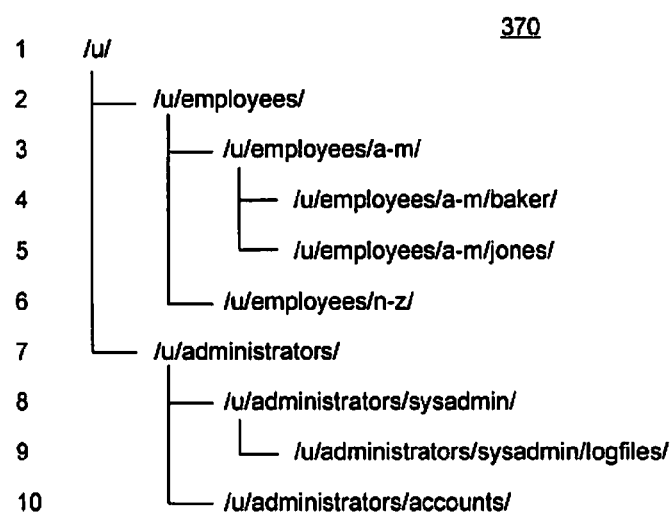

1  /u/
2  ├── /u/employees/
3  │   ├── /u/employees/a-m/
4  │   │   ├── /u/employees/a-m/baker/
5  │   │   └── /u/employees/a-m/jones/
6  │   └── /u/employees/n-z/
7  └── /u/administrators/
8      ├── /u/administrators/sysadmin/
9      │   └── /u/administrators/sysadmin/logfiles/
10     └── /u/administrators/accounts/

*FIG. 3C*

METHOD AND APPARATUS FOR REPRESENTING FILE SYSTEM METADATA WITHIN A DATABASE FOR EFFICIENT QUERIES

FIELD OF THE INVENTION

At least one embodiment of the present invention pertains to networked storage systems, and more particularly to a method and apparatus for collecting and reporting data pertaining to files stored on a storage server.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A filer may be connected to a network, and may serve as a storage device for several users, or clients, of the network. For example, the filer may store user directories and files for a corporate or other network, such as a LAN or a wide area network (WAN). Users of the network can be assigned an individual directory in which they can store personal files. A user's directory can then be accessed from computers connected to the network.

A system administrator can maintain the filer, ensuring that the filer continues to have adequate space, that certain users are not monopolizing storage on the filer, etc. A Multi-Appliance Management Application (MMA) can be used to monitor the storage on the filer. An example of such an MMA is the Data Fabric Monitor (DFM) products made by Network Appliance, Inc. in Sunnyvale, Calf. The MMA may provide a Graphical User Interface (GUI) that allows the administrator to more easily observe the condition of the filer.

The MMA needs to collect information about files stored on the filer to report back to the administrator. This typically involves a scan or "file walk" of storage on the filer. During the file walk, the MMA can determine characteristics of files stored on the filer, as well as a basic structure, or directory tree, of the directories stored thereon. These results can be accumulated, sorted, and stored in a database, where the administrator can later access them.

On a large system, the file walk can be a very resource intensive process. Additionally, on a typical system having a large amount of storage, the results of the file walk can be very large. As a result, traversing the results of the file walk stored in the database can also be very resource intensive. What is needed is a way to store the results of a file walk so that they can easily be accessed and searched by an administrator.

SUMMARY OF THE INVENTION

A method for creating a file information database is disclosed. A storage server having a directory structure is scanned. Data regarding the directory structure is collected. Identification (ID) numbers are assigned to directories in the directory structure according to a depth first search (DFS) order. A table including the ID numbers is then written.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 3B illustrates an expanded table;
FIG. 3C illustrates the relationship between the directories in the tree.

DETAILED DESCRIPTION

Described herein are methods and apparatuses for representing a directory structure using a depth first search (DFS) order. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the present invention, a filer or other storage server is coupled to a network to store files for users of the network. An agent is coupled to the filer and performs a scan or file walk of the file system of the filer for a Multi-Appliance Management Application (MMA), which is coupled to the filer and can monitor and manage the filer. The agent assigns identification (ID) numbers to the directories in the file system while scanning them. The ID numbers are assigned in a depth first search (DFS) order so that the results are less difficult and require fewer resources to traverse. Assigning the IDs facilitates efficient queries that may be useful to a system administrator monitoring the filer or other storage server. Several types of queries, including determining the parent of a node, determining all of the children of a node, determining the immediate children of a node, and determining all of the ancestors of a node may be easily accomplished using the ID numbers.

Figure 1:
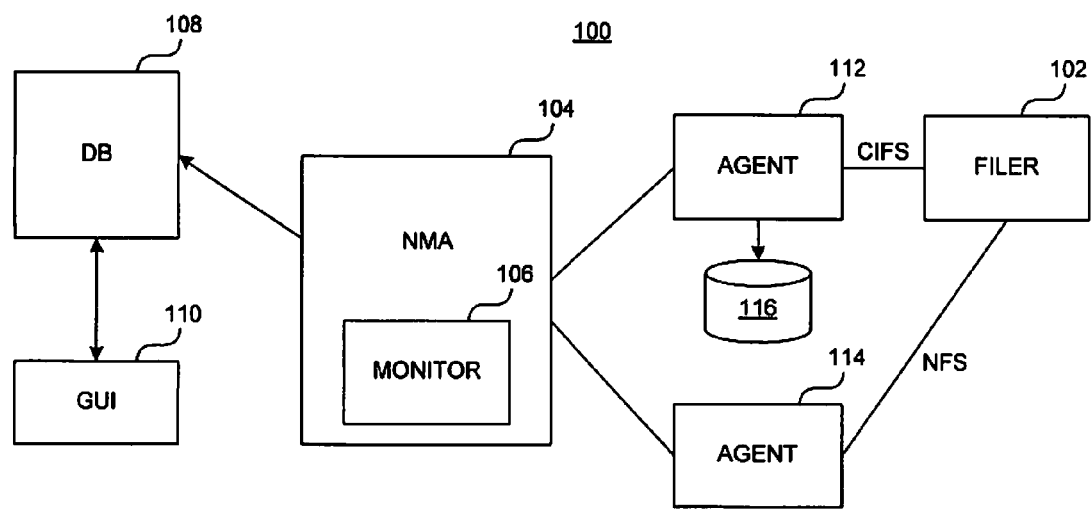
FIG. 1 illustrates a monitoring system for a storage server.

FIG. 1 illustrates a monitoring system for a storage server. The system 100 includes a filer 102, an MMA 104 including a monitor 106, a database 108, a GUI 110, and two agents 112 and 114. The agents 112 and 114 can perform a file walk of the filer 102 for the MMA 104. An agent may be an independent server that is attached to the network and is dedicated to performing file walks. By having an agent perform this task rather than having the MMA do it, the MMA can save its resources for other tasks, such as monitoring current activity on the filer 102 using the monitor 106. Ultimately, one goal is to minimize the amount of work the MMA is required to do. Additionally, multiple agents can be added to perform a complete file walk in less time if necessary.

According to one embodiment of the invention, the agents 112 and 114 may use a file system different from the one used by the filer 102. For example, the agent 112 uses the Common Internet File System (CIFS), while the agent 114 uses the Network File System (NFS). Here, either agent 112 or 114 is able to perform the file walk of the filer 102, regardless of the file system used by the filer 102. The agent 112 also has storage 116 to store the results of a file walk while the walk is occurring and before they are transferred to the MMA 104. The agent 114 may also have attached storage for this purpose.

The results of a file walk may be transferred to and stored on the database server 108 after the file walk is complete. The database server 108 can then be accessed by the GUI 110, so that an administrator can search the results of the file walk. The GUI may allow the administrator to easily parse the results of a specific file walk, including allowing the administrator to monitor the total size of files stored on the filer, the size of particular directories and their subdirectories, the parents of specific directories, etc. These queries will be discussed in more detail below. The file walk may also collect statistics about the files on the filer, such as the total size of files, the most accessed files, the types of files being stored, etc. According to one embodiment, the GUI 110 may be a web-based Java application.

Figures 2, 3A:
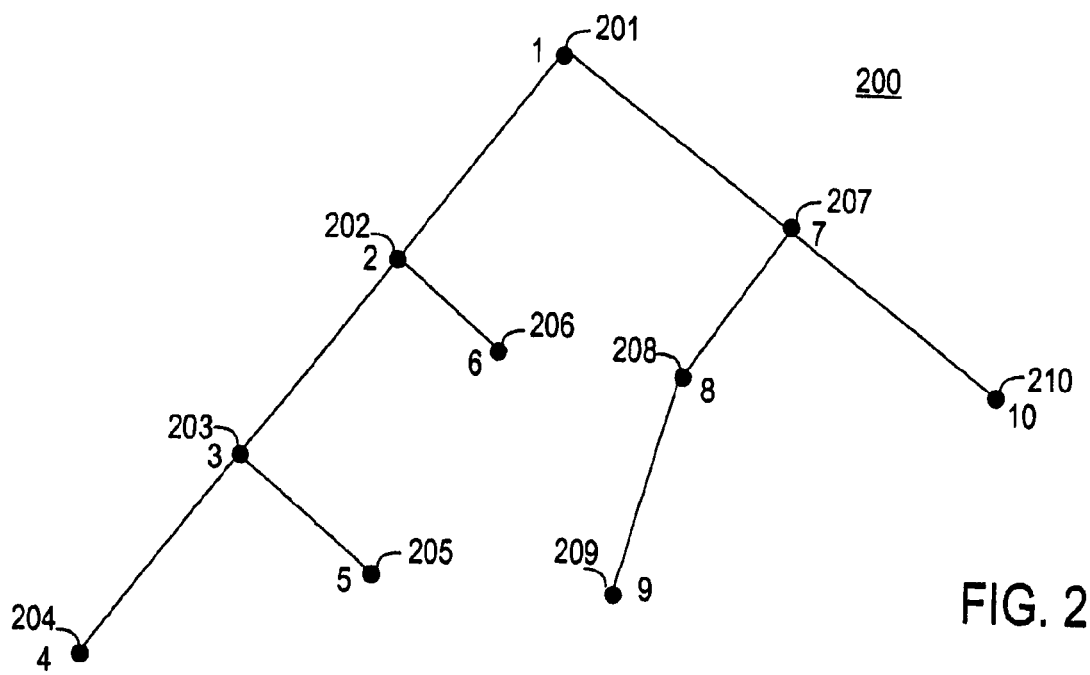
FIG. 2 illustrates a tree using a DFS order.
FIG. 3A illustrates a simplified table showing a node and its parent.

FIG. 2 illustrates a tree using a DFS order. A "tree" is a data structure that relates nodes. The "root" node is a the top of the tree and an "ancestor" to all other nodes. The nodes are connected by branches. The tree is useful because it can easily represent positional relationships between nodes. Further, the tree allows a user to easily traverse the information stored in the tree. Two common types of trees are the "Adjacency List" tree and the "Nested Set" representation. The Nested Set representation allows for easy querying of a subtree, however it can be somewhat complicated because each parent is assigned two IDs. For example, it is difficult to modify a nested set representation after it has been initially determined.

In this context, a tree represents a directory structure. A "node" is a point on the tree from which the tree branches off to other nodes or terminates. For example, the elements 201-210 are all nodes of the tree 200. A node, as used here, will represent a directory or file on the storage or file server. A "parent" of a first node is a second node located immediately above the first node in the tree. A "child" is the first node in relation to the second node. For example, a parent directory will have a child directory located within it. Here, the node 201 is the parent of the node 202, and the node 202 is the child of the node 201. A "sibling" is a node on the same level as another node. For example, two directories found embedded in the same parent directory are siblings. Here, the node 202 and the node 207 are siblings. Siblings always have the same parent.

Identification numbers (IDs) can be issued to each node to facilitate searching or querying the tree. In one embodiment, the IDs are issued during the file walk. The IDs can easily identify a node such as a specific directory or file. The IDs can also identify specific relationships between nodes, depending on the type of tree chosen.

The tree 200 has several nodes 201-210 that may represent directories stored on the filer 102. The nodes 201-210 have corresponding ID numbers 1-10, all in a DFS order. The DFS order assigns ID numbers to the nodes 201-210 by traversing down to the end of the tree first, and across the tree next. For example, the ID number 1 is assigned to the node 201, the number 2 to the node 202, and so on until the node 204 is reached. The node 204 has no children, i.e. has no embedded directories. Since the numbering system has reached the "deepest" directory, the process will move onto the siblings of the node 204. In this case, the node 204 has one sibling, the node 205. The node 205 will be assigned the next ID number, or 5. Since the node 205 has no children, the process will move up the tree looking for the next unassigned sibling, which is the node 206 here. The node 206 is then assigned an ID number of 6, the next available number. This process is repeated until all nodes 201-210 have been assigned ID numbers. As a result of the DFS ordering, all children of a particular node have an ID greater than the particular node, and all siblings of the node either have an smaller ID than the node or an ID number greater than all of the children of the node.

FIGS. 3A-B illustrate a table that lists the IDs of nodes in the tree 200. FIG. 3A illustrates a simplified table showing a node and its parent. The table 300 includes two columns 302 and 304. According to one embodiment, the table 300 is reported to and saved on the database server 108 after the file walk is completed. The table 300 includes a listing of the IDs of the nodes in the column 302 as well as their parent's IDs in the column 304. The list of nodes and parents in the table 300 allows an administrator to easily traverse the directory tree, as well as perform efficient queries, which will be discussed with regard to FIG. 5.

FIG. 3B illustrates an expanded table 350. The table 350 includes the columns 302 and 304 from the table 300, but also includes statistical information gathered during the file walk. The statistical information can be shown in the columns 352, 354, and 356. For example, here, column 352 includes the total size of files located in a specific directory. As an example, the size '4.1 GB' listed for the node 1 includes the size of all of the files located in the directory represented by the ID '1', as well as the size of the files in node 1's descendents, or the nodes 2-6. The column 354 lists the creation time of the directory. The column 356 lists the name of the directory. As shown here, the directories are names according to the Unix convention, however it is understood that any type of file system may be used. Other types of data may also be represented in the table 350. For example, the number of files stored in a directory, the types of files stored in a directory, the largest file stored in a directory, etc. The system administrator may instruct the agent to produce a table including any parameter that the administrator feels is useful.

FIG. 3C illustates the relationship between the directories in the tree 200. The relationship between the position of certain directories and the IDs assigned to those directories can be seen. As is seen, all descendents of the directory having the ID 2, or '/u/employees', are assigned IDs before '/u/employees's sibling 'u/administrators', which is given the ID 7. When assigning the IDs during the file walk, according to one embodiment, the agent begins with the root directory, chooses the first directory to scan, and scans all of the contents of that directory before continuing to that directory's sibling. This ordering makes it easier to perform certain queries, such as determining all of the descendents of a specific directory. For example, if one wanted to determine all the descendents of the directory '/u/employees', the only determination that needs to be made is that directory's ID number and the ID number of the next sibling of that directory. For example, all of the descendents of '/u/employees' are assigned the ID numbers 2-6.

Figure 4:
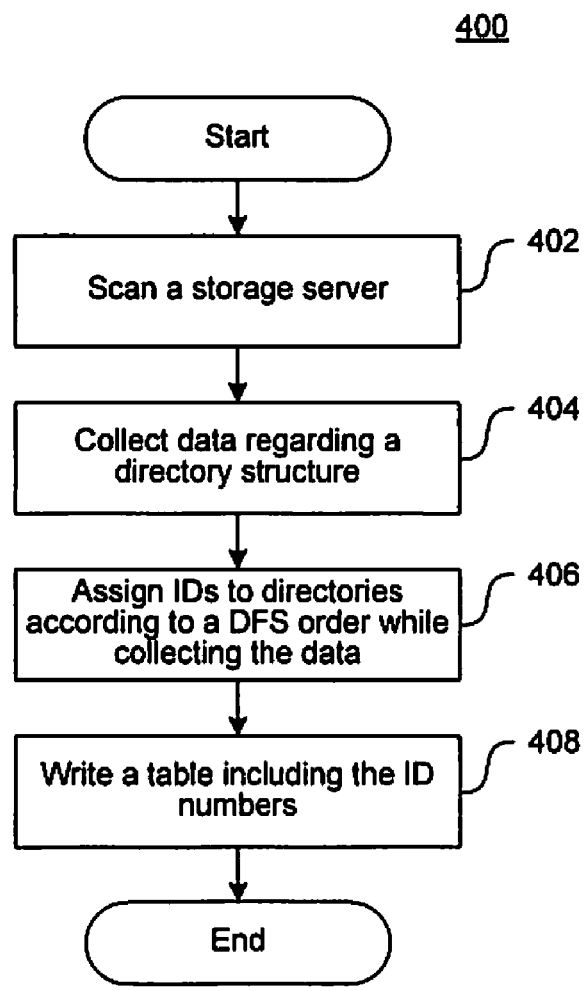
FIG. 4 is a flowchart illustrating a method according to one embodiment of the invention.

FIG. 4 is a flowchart illustrating a method for assigning DFS IDs according to one embodiment of the invention. The process 400 is a method performed by an agent for assigning IDs to the directories. In block 402, a storage server is scanned. The storage server may be, for example, a filer such as the filer 102 in FIG. 1. The scan may be a file walk performed by an agent to collect information and statistics about files stored on the storage server.

In block 404, data is collected regarding a directory structure. The data refers to the location of directories and characteristics of files stored in those directories. For example, this may be data generated for the table 350. The scan may create relationships between the directories so that a tree, such as the tree 200, can be created. This data may be stored on a database server such as the database server 108 and can be reported to a system administrator through a GUI 110.

Figure 5:
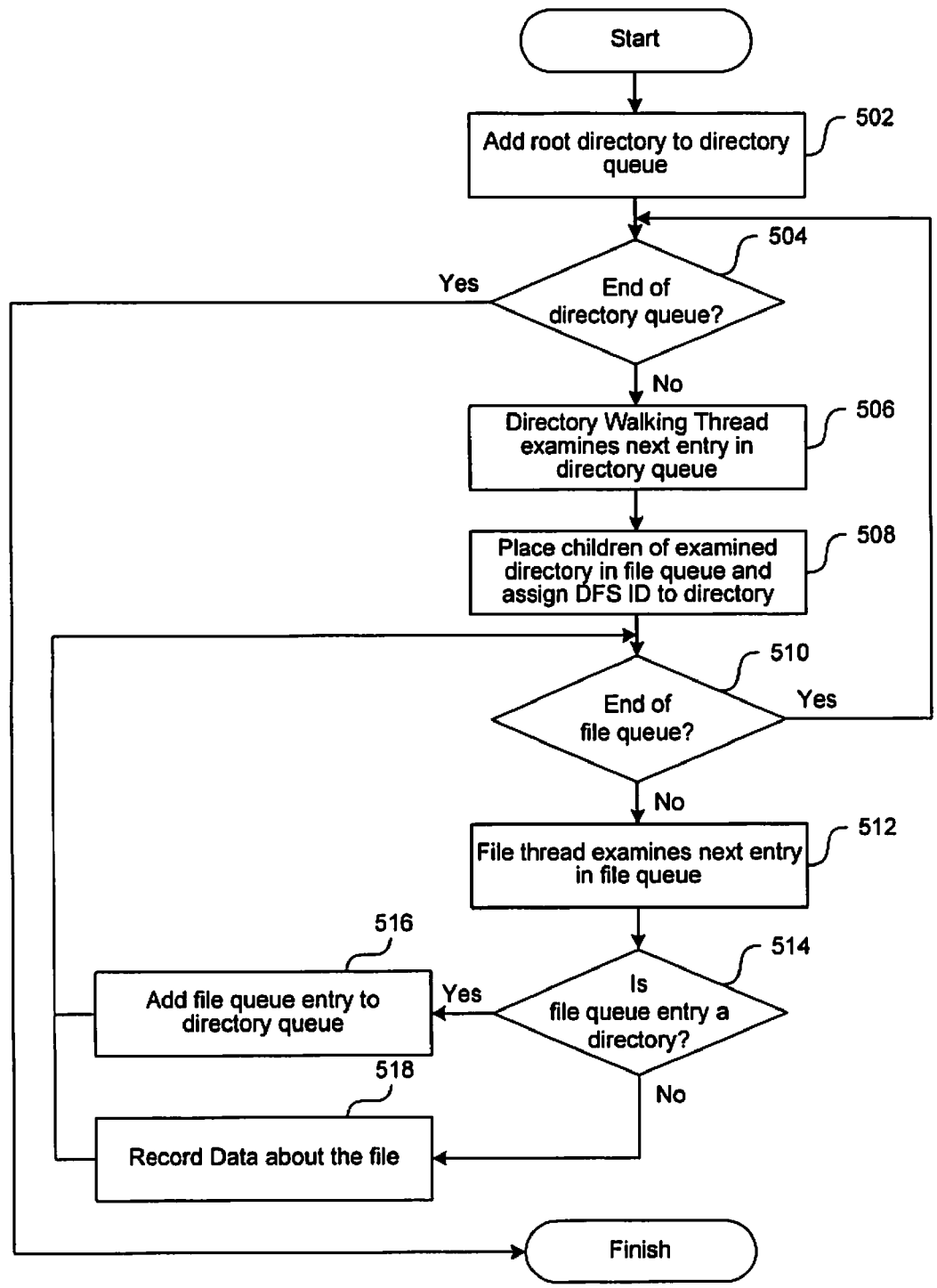
FIG. 5 is a flowchart illustrating a process for using multiple threads to assign IDs in a DFS order.

In block 406, IDs are assigned to directories according to a DFS order while collecting the data. The agent is responsible for determining the organization of the directories into a directory tree. While the agent is organizing the directories, the agent can assign DFS IDs to each directory it encounters. These IDs can later be used to perform efficient queries, such as determining all the children of a specific directory, determining the parent of a specific directory, determining the ancestors of a directory, or the immediate children of a directory. The IDs are assigned in the order in which the directories are scanned, while data is being collected about the directory structure. In an operational sense, the agent also scans the directories in a DFS order. FIG. 5 contains more detail about the process of assigning DFS IDs.

In block 408, a table including the ID numbers is written. The table may include a list of the ID numbers, cross referenced with a name of the directory and the ID of the parent of the directory. This table can be used by a monitoring device or other server to determine the results of the queries mentioned above. The table can be written to a DB server such as the DB server 108. Once the table has been written, the process 400 is finished.

According to an embodiment of the invention, the file walk is performed by a single thread. A thread may be a program capable of operating independently of other programs. The thread may traverse and examine all files and directories found on a storage server to establish a logical tree. The thread may be configured to examine the contents of the server in a DFS order, so that each identified directory is assigned an ID in a DFS order.

FIG. 5 is a flowchart illustrating a process for using multiple threads to assign IDs in a DFS order. According to another embodiment of the present invention, the file walk is multi-threaded to improve performance. A directory queue may contain a list of known directories, starting with the root directory. A directory walking thread examines a queue of directories by exploring the first directory in the directory queue, listing the children of the directory, and placing the children in a file queue so that they can be examined by a file thread. There may be multiple file threads. The file thread examines the file queue established by the directory walking thread and determines whether its members are files or directories. Each directory identified by the file queue is put on the directory queue to be examined by the directory walking thread. When the file thread encounters a file, the thread records data about that file and continues through the file queue. The directory queue may begin with only the root directory, and the directory walking thread can determine the contents of the root directory, placing those contents on the file queue. The file thread then examines and determines which of the root directory's children are directories, and places them on the directory queue. The process continues until there are no remaining children to examine.

The directories are chronologically assigned IDs. In other words, the first directory examined by the directory walking thread will be assigned the ID '1,' the second directory will be assigned the ID '2,' etc. If both threads operate simultaneously, they would be unable to maintain a DFS order. A condition variable and a mutex can be used to ensure the proper order. A mutex, or mutual exclusion object, allows multiple threads to share the same resource. While one thread is using the resource, access to the resource is denied to all other threads. The condition variable allows a resource to be blocked based on a condition. For example, when the file queue is empty, the condition variable may be signaled, allowing the directory walking thread to continue. Essentially, only one thread may operate at any given time to ensure the proper order is maintained. In practice, after the directory walking thread determines the children of a specific directory, the directory walking thread will cease examining directories, and allow the file thread to examine the file queue. Once the file queue is empty, the process resumes with the directory walking thread examining the next directory.

The process 500 illustrates the operation of the two threads. In block 502, the root directory is added to the directory queue. The root directory is the main directory of a file system, represented by the root, or top, node of a file tree. In block 504, it is determined whether there are any directories remaining in the directory queue. If not, the process ends, since every directory on the volume has been examined. If there are more directories, the process continues to block 506.

In block 506, the file walking thread examines the next directory in the directory queue. The examination of the directory reveals the children of the directory, or the directories and files stored within the directory. In block 508, the children of the directory being examined are placed on the file queue, and the current directory is assigned the next available ID. The root directory is assigned the ID '0'.

In block 510, it is determined whether there are any more entries in the file queue. If there are, the process continues on to block 512. If not, the process returns to block 504, where the next directory will be examined. In block 512, the file thread examines the next entry in the file queue. In block 514, it is determined whether that entry is a file or a directory. If it is a directory, in block 516, the directory is added to the front of the directory queue, and the process returns to block 504. If the entry is a file, in block 518 data about the file is recorded, and the process returns to block 504 to examine the next directory.

Figure 6:
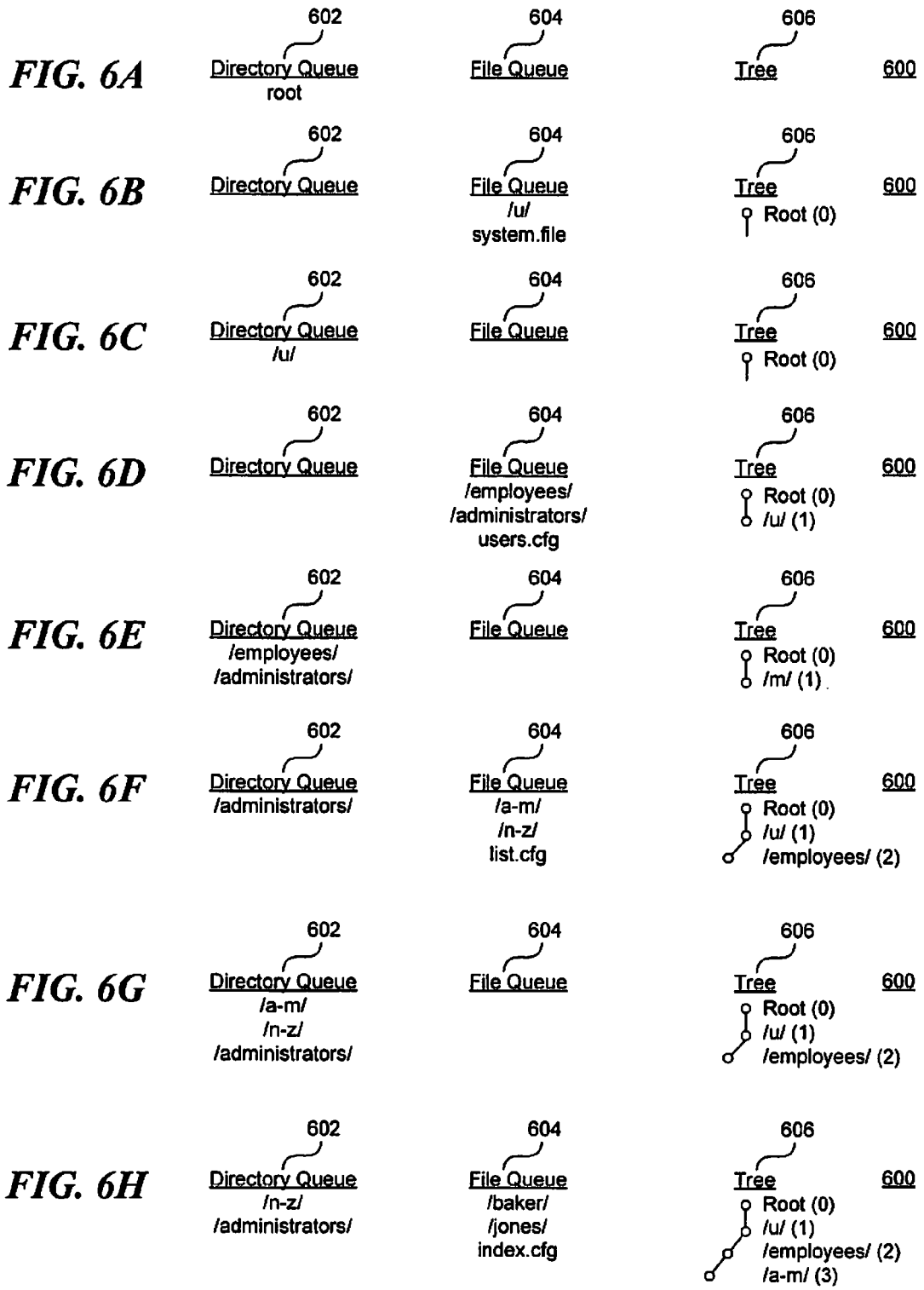
FIGS. 6A-H illustrate the process 500 as applied to a directory structure.

FIGS. 6A-H illustrate the process 500 as applied to the directory structure 370. In FIG. 6A, the root directory is added to the directory queue 602. The file queue 604 and the tree 606 are empty, since the process has just begun. In FIG. 6B, the root directory is removed from the directory queue 602 and examined, and its children, /u/ and system.file are placed in the file queue 604. The root directory is assigned the ID '0' and placed in the tree 606.

In FIG. 6C, the file queue 604 has been examined, and the directory /u/ is taken from the file queue 604 and placed in the directory queue 602. In FIG. 6D, the directory /u/ is examined, and its children are placed in the file queue 604. The directory /u/ is assigned the next ID '1', and placed on the tree 606. In FIG. 6E, the directories that are /u/'s children, namely /employees/ and /administrators/ are placed in the directory queue 602. In FIG. 6F, the directory /employees/ is removed from the directory queue 602 and its children are placed in the file queue 604. The directory /employees/ is assigned the next ID '2', and placed in the tree 606.

In FIG. 6G, /employees/'s children are placed at the top of the directory queue 602, before the directory /administrators/. According to the DFS order, the children of a directory are examined before its next sibling is. In FIG. 6H, the directory /a-m/ is examined, removed from the directory queue 602, and its children are placed in the file queue 604. The director /a-m/ is assigned the ID '3', and placed in the tree 606.

Figure 7:
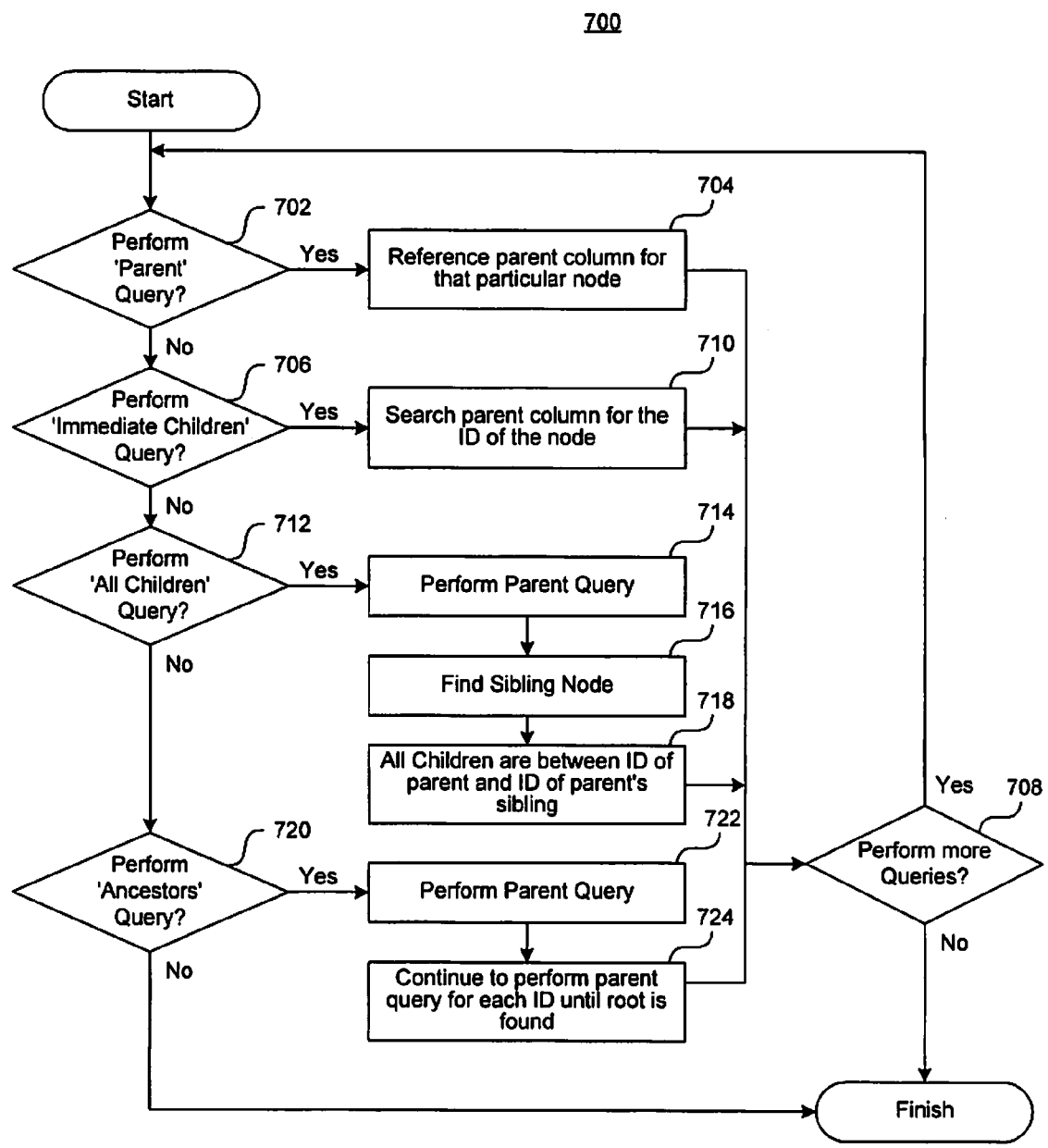
FIG. 7 is a flowchart illustrating a process for executing queries.

FIG. 7 is a flowchart illustrating a process performed by an agent for executing queries. The queries discussed in the process 700 may be performed using the table 300 or the table 350, which will be used to illustrate the examples given. Various types of queries other than those mentioned here are possible using the table described herein. However, those queries shown are representative of what can be done.

In block 702, if a user wants to perform a 'Parent' query, the process continues to block 704. If not, the process continues to block 706. Since the parent node is listed in the column 304, this query is trivial, requiring only one inquiry. In block 704, the parent column is reference for the particular node. The node's ID is found in the column 302, and the entry in the same row in column 304 is the parent ID. For example, if the parent of node 2 is to be determined, the system can search the column 302 for the node 2, and then reference the corresponding entry in the column 304 to determine that the node 1 is the parent of the node 2. Once the query is completed, the process moves to block 708, where it is determined whether more queries should be performed.

In block 706, if a user wants to perform the 'Immediate Children' query, the process continues to block 710. If not, the process continues to block 712. A node's immediate children are the nodes found directly beneath it. In block 710, the immediate children of a node can be determined by searching the parent column 304 for instances of that node. For example, the children of node 2 can be found by searching the column 304 for any occurrences of the ID 2. It can be seen that the ID 2 is found next to the nodes 3 and 6, which are the immediate children of node 2.

In block 712, if a user wants to perform the 'All Children' query, the process continues to block 714. If not, the process moves to block 720. All of the children of a specific node, i.e. a subtree located beneath the specific node, are found by first determining the ID of the sibling of the specific node. If the node has more than one sibling, the sibling having the next highest ID number (after the specific node) will be used. The sibling of the specific node can be determined by first determining the parent of the specific node in block 714 (see block 704). For example, if a user wanted to find all the children of the node 2, it is first determined that the parent of node 2 is node 1 by referencing the appropriate column in the table 300. In block 716, the sibling of the node is determined by searching for the next highest ID number that is also a child of node 1. Here, the only sibling of node 2 is node 7. As mentioned above, it is a characteristic of the DFS ordering that all of the children of a specific node will be assigned IDs before the sibling of that node is. So, as determined in block 718, the children of node 2 must be the nodes 3, 4, 5 and 6.

In block 720, if a user wants to perform an 'Ancestors' query, the process continues to block 722. An ancestors query determines a node's parent, grandparent, etc. until the root node is reached. In block 722, the parent query is performed to determine the parent of the specified node. For example, if we want to find the ancestors of node 5, we first determine that the node 3 is the parent of the node 5. Next, in block 724, it is determined what the parent of the parent of the requested node is; here the parent of node 3 is node 2. This process continues until the parent is the node 0, or the root. The result of an ancestors query on the node 5 would be 3, 2, 1. Depending on the location of the requested node within the tree, the ancestors query will require a number of requests equal to the depth of the tree.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative, rather than in a restrictive sense.

What is claimed is:

1. A method for creating a file information database comprising:

scanning a storage server having a directory structure;

collecting data regarding the directory structure;

for each directory of the directory structure, determining whether each member of the directory is a file or subdirectory;

using a first thread to:

traverse the directory structure in a depth first search (DFS) order; and assign a first unique identification (ID) number to a first determined directory and a second unique ID number to a second determined directory in the directory structure, wherein the ID numbers are assigned while the directory structure is being traversed in the DFS order, and wherein the ID numbers correspond to the DFS order in which the determined directories are traversed;

using a second thread to examine the determined files;

writing a data structure including the first ID number, the second ID number and a relation between the first directory and the second directory, wherein the relation indicates that the first directory is an immediate child of the second directory;

receiving a request to determine an immediate child or parent of a specified directory, wherein the specified directory is the first directory or the second directory;

searching the data structure for any relation indicative that the specified directory is a child or a parent in said relation, wherein said searching produces as a result said relation between the first directory and the second directory; and determining the immediate child or parent of the specified directory based on said any relation.

2. The method of claim 1, wherein scanning and collecting comprise scanning and collecting by using an agent separate from the storage server.

3. The method of claim 2, wherein the agent has a first file system, and the storage server has a second file system, and wherein the first file system is different from the second file system.

4. The method of claim 1, wherein assigning further comprises assigning the ID numbers while collecting the data.

5. The method of claim 1, wherein writing the data structure further comprises writing the data structure to a database server.

6. The method of claim 1, further comprising:
receiving a request to determine a set of ID numbers of every child of a third directory in the directory structure, wherein the third directory is assigned a third ID number;
determining a fourth ID number of a sibling of the third directory; and
determining the set of ID numbers between the third ID number and the fourth ID number.

7. The method of claim 1, wherein a top level directory of the directory structure is assigned an ID of "0" (zero).

8. A machine readable medium having stored thereon executable program code which, when executed, causes a machine to perform a method for creating a file information database, the method comprising:
scanning a storage server having a directory structure;
collecting data regarding the directory structure;
for each directory of the directory structure, determining whether each member of the directory is a file or subdirectory;
using a first thread to:
traverse the directory structure in a depth first search (DFS) order; and
assign a first unique identification (ID) number to a first determined directory and a second unique ID number to a second determined directory in the directory structure, wherein the ID numbers are assigned while the directory structure is being traversed in the DFS order, and wherein the ID numbers depend on the DFS order in which the determined directories are traversed;
using a second thread to examine the determined files;
writing a data structure including:
the first ID number,
the second ID number,
in association with the first ID number, an indication of a relation between the first directory and the second directory, wherein the relation indicates that the first directory is an immediate child of the second directory;
receiving a request to determine an immediate child or parent of a specified directory, wherein the specified directory is the first directory or the second directory;
searching the data structure for any relation indicative that the specified directory is a child or a parent in said relation, wherein said searching produces as a result said relation between the first directory and the second directory; and
determining the immediate child or parent of the specified directory based on said any relation.

9. The machine readable medium of claim 8, wherein scanning and collecting comprise scanning and collecting using an agent separate from the storage server.

10. The machine readable medium of claim 9, wherein the agent has a first file system, and the storage server has a second file system, and wherein the first file system is different from the second file system.

11. The machine readable medium of claim 8, wherein assigning further comprises assigning the ID numbers while collecting the data.

12. The machine readable medium of claim 8, wherein writing the data structure further comprises writing the data structure to a database server.

13. The machine readable medium of claim 8, further comprising:
receiving a request to determine a set of ID numbers of every child of a third directory in the directory structure, wherein the third directory is assigned a third ID number;
determining a fourth ID number of a sibling of the third directory; and
determining the set of ID numbers between the third ID number and the fourth ID number.

14. A method for creating a file information database comprising:
scanning a storage server having a directory structure;
for each directory of the directory structure, determining whether each member of the directory is a file or subdirectory;
using a first thread to assign a first unique identification (ID) number to a first determined directory and a second unique ID number to a second determined directory in the directory structure according to a depth first search (DFS) order, wherein the ID numbers are assigned while the directory structure is being traversed in the DFS order, and wherein the ID numbers are chronologically assigned in numerical order based on the DFS order in which the directory structure is traversed;
using a second thread to examine the determined files;
writing a data structure including the first ID number, the second ID number and a relation between the first directory and the second directory, wherein the relation indicates that the first directory is an immediate child of the second directory, and wherein the data structure is traversable based on the ID numbers to determine relationships between directories of the storage server;
receiving a request to determine an immediate child or parent of a specified directory, wherein the specified directory is the first directory or the second directory;
searching the data structure for any relation indicative that the specified directory is a child or a parent in said relation, wherein said searching produces as a result said relation between the first directory and the second directory; and
determining the immediate child or parent of the specified directory based on said any relation.

* * * * *